United States Patent
Hatanaka et al.

(10) Patent No.: US 10,088,923 B2
(45) Date of Patent: Oct. 2, 2018

(54) OPERATION INPUT DEVICE AND OPERATION INPUT METHOD

(71) Applicant: DENSO CORPORATION, Kariya, Aichi-pref. (JP)

(72) Inventors: Shinji Hatanaka, Kariya (JP); Tetsuya Tomaru, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 15/122,859

(22) PCT Filed: Mar. 9, 2015

(86) PCT No.: PCT/JP2015/001275
§ 371 (c)(1),
(2) Date: Aug. 31, 2016

(87) PCT Pub. No.: WO2015/141175
PCT Pub. Date: Sep. 24, 2015

(65) Prior Publication Data
US 2017/0068338 A1    Mar. 9, 2017

(30) Foreign Application Priority Data
Mar. 18, 2014    (JP) .................................. 2014-055261

(51) Int. Cl.
*G06F 3/038* (2013.01)
*B60K 35/00* (2006.01)
(Continued)

(52) U.S. Cl.
CPC ............ *G06F 3/0383* (2013.01); *B60K 35/00* (2013.01); *B60K 37/06* (2013.01);
(Continued)

(58) Field of Classification Search
CPC ... G06F 3/0383; G06F 3/03547; B60K 35/00; B60K 37/06; B60K 2350/1024; B60K 2350/1052; B60K 2350/352
(Continued)

(56) References Cited

U.S. PATENT DOCUMENTS

2004/0154848 A1    8/2004    Kitagawa et al.
2004/0255673 A1*   12/2004   Hattori .................... G01P 21/00
                                                    73/514.16
(Continued)

FOREIGN PATENT DOCUMENTS

JP    H08137608 A      5/1996
JP    2004256089 A     9/2004
(Continued)

*Primary Examiner* — Stephen G Sherman
(74) *Attorney, Agent, or Firm* — Harness, Dickey & Pierce, P.L.C.

(57) ABSTRACT

An operation input device provided in a vehicle and operated by a hand or a finger of a driver to carry out an input according to a movement amount of the hand or the finger of the driver is provided. The operation input device includes a time series signal generator that detects the movement amount and generates a time series signal of the movement amount, an input operation accepter that accepts an input operation of the driver based on the time series signal, and a band attenuation filter that is provided between the time series signal generator and the input operation accepter and attenuates, of signal components of the time series signal, a signal component from a predetermined first frequency to a predetermined second frequency larger than the first frequency.

12 Claims, 9 Drawing Sheets

(51) Int. Cl.
*B60K 37/06* (2006.01)
*G06F 3/0354* (2013.01)

(52) U.S. Cl.
CPC .. *G06F 3/03547* (2013.01); *B60K 2350/1024* (2013.01); *B60K 2350/1052* (2013.01); *B60K 2350/352* (2013.01)

(58) Field of Classification Search
USPC .......................................................... 345/157
See application file for complete search history.

(56) References Cited

U.S. PATENT DOCUMENTS

| | | | |
|---|---|---|---|
| 2005/0236210 A1* | 10/2005 | Kawazoe | B60Q 9/008 180/272 |
| 2010/0103100 A1 | 4/2010 | Yamamoto | |
| 2011/0141066 A1 | 6/2011 | Shimotani et al. | |
| 2012/0223990 A1 | 9/2012 | Tanoue et al. | |
| 2013/0085711 A1* | 4/2013 | Modi | G01C 22/006 702/141 |

FOREIGN PATENT DOCUMENTS

| | | |
|---|---|---|
| JP | 2010-202162 A | 9/2010 |
| JP | 2012-181703 A | 9/2012 |
| JP | 2013069349 A | 4/2013 |
| WO | WO-2010064389 A1 | 6/2010 |

* cited by examiner

LOW PASS FILTER (COMPARATIVE EXAMPLE)

FIG. 5B

BAND ATTENUATION FILTER (PRESENT EMBODIMENT)

FIRST DIGITAL FILTER PROCESS

FIG. 8B

SECOND DIGITAL FILTER PROCESS

OPERATION INPUT DEVICE AND OPERATION INPUT METHOD

CROSS REFERENCE TO RELATED APPLICATIONS

This application is a U.S. National Phase Application under 35 U.S.C. 371 of International Application No. PCT/JP2015/001275 filed on Mar. 9, 2015 and published in Japanese as WO 2015/141175 A1 on Sep. 24, 2015. This application is based on and claims the benefit of priority from Japanese Patent Application No. 2014-055261 filed on Mar. 18, 2014. The entire disclosures of all of the above applications are incorporated herein by reference.

TECHNICAL FIELD

The present disclosure relates to a technology for accepting a vehicle driver's operation to input predetermined information.

BACKGROUND ART

Recent vehicles are equipped with various systems such an audio system for music reproduction and a navigation system for destination guidance. Some systems adjust a scale and move a cursor on a display screen. For example, when a rotation operation is performed on a dial type input device, an audio system adjusts a scale (sound volume) according to an operation amount of the rotation operation. When a finger slide operation is performed on a touch pad, a navigation system moves a destination selection cursor on a display screen.

In a vehicle, driver's finger or hand movement may become shaky due to an external factor such as a vehicle vibration, and the scale adjustment or the cursor movement on the screen may become unstable. For example, the unstable operation amount of the rotation operation may make adjustment to an intended sound volume difficult in some cases, and the unstable operation amount of the slide operation may make the positioning of the cursor difficult in some cases.

There is a proposed technology (Patent Literature 1) that uses a low pass filter to remove an external factor causing the scale adjustment and cursor movement to become a shaky motion and thereby smooth the scale adjustment and cursor movement.

Patent Literature 1: JP H08-137608A

SUMMARY OF INVENTION

According to studies by the inventors of the present application, although the scale adjustment and cursor movement are smoothed in the proposed technology, the proposed technology provides a driver to such a feeling of incompatibility that a response to the driver's hand or finger movement is delayed momently.

The present disclosure is made in view of the foregoing and has an object to provide a technology that can suppress an influence of an external factor on an input result and suppresses a driver's feeling of incompatibility.

In an example of the present disclosure, an operation input device provided in a vehicle and operated by a hand or a finger of a driver to carry out an input according to a movement amount of the hand or the finger of the driver is provided. The operation input device comprises: a time series signal generator that detects the movement amount and generates a time series signal of the movement amount; an input operation accepter that accepts an input operation of the driver based on the time series signal; and a band attenuation filter that is provided between the time series signal generator and the input operation accepter and attenuates, of signal components of the time series signal, a signal component from a predetermined first frequency to a predetermined second frequency larger than the first frequency.

In an example of the present disclosure, an operation input method for use in a vehicle and for inputting according to a movement amount of a hand or a finger of a driver when the driver carries out an operation with the hand or the finger is provided. The operation input method comprises: a step of detecting the movement amount and generating a time series signal of the movement amount; a step of attenuating, of signal components of the time series signal, a signal component from a predetermined first frequency to a predetermined second frequency larger than the first frequency; and a step of accepting an input operation of the driver based on the time series signal whose signal component from the first frequency to the second frequency has been attenuated.

According to these operation input device and operation input method, because the operation input is accepted based on the time series signal having the attenuated signal component that corresponds to an external factor (shaky movement) such as a frequency of the vehicle and that is from the first frequency to the second frequency, a smooth input in which the influence of the external factor is suppressed becomes available. Moreover, because the operation input is accepted based on the time series signal in which signal components higher than the second frequency have not been attenuated, a delay in rising up of the movement amount signal after the passage of the band attenuation filter with respect to the movement amount signal before the passage of the band attenuation filter can be shortened. Therefore, a time taken for the information input to follow the finger or hand movement (motion) can be shortened and the driver's feeling of incompatibility cab be suppressed.

BRIEF DESCRIPTION OF DRAWINGS

The above and other objects, features and advantages of the present disclosure will become more apparent from the below detailed description made with reference to the accompanying drawings. In the drawings.

EMBODIMENTS FOR CARRYING OUT INVENTION

Embodiments of an operation input device will be described below.

Figure 1:
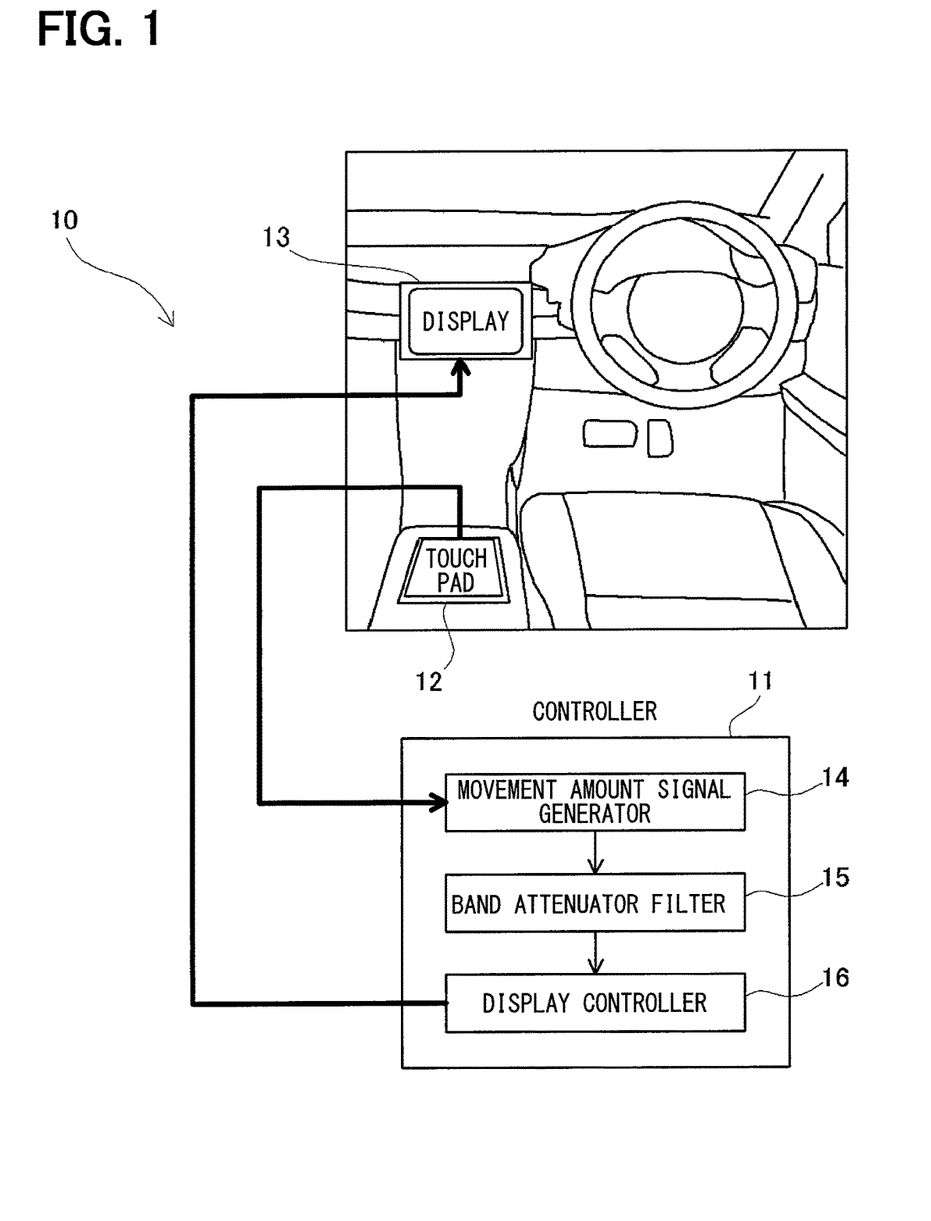
FIG. 1 is a diagram illustrating a configuration of an operation input device.
Figure 2:
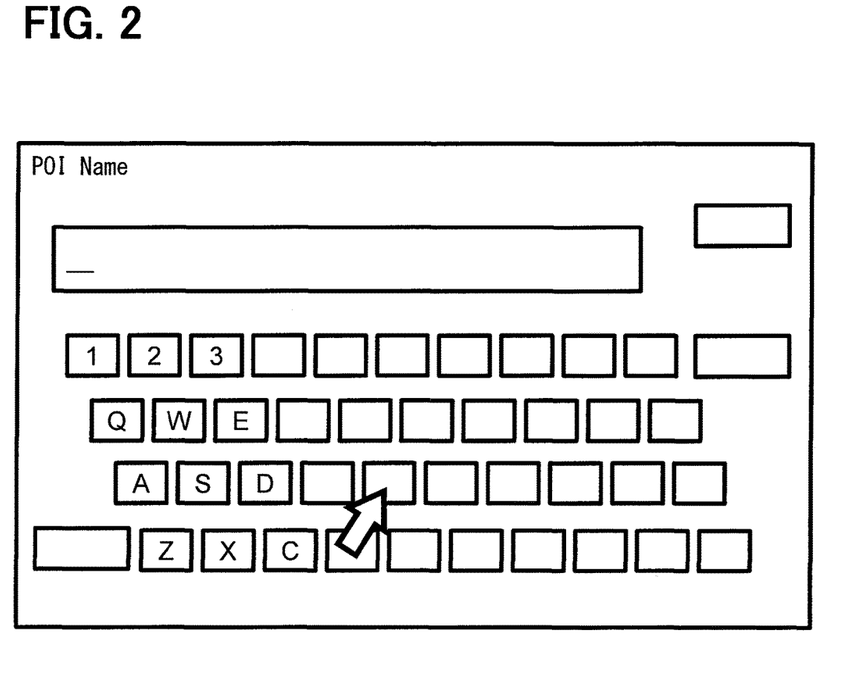
FIG. 2 is a diagram illustrating a destination selection screen displayed on a display device.

A. Device Structure:

FIG. 1 illustrates a structure of an operation input device 10 arranged in a vehicle. In the operation input device 10 of the present embodiment, a controller 11 displays and moves (movement display) a cursor on a display device 13 based on a movement amount of a driver's finger sliding on a touch pad 12 (moving on a touch pad 12). For example, as shown in FIG. 2, a navigation system may display a destination selection screen on the display device 13. In this state, based on the movement amount of the driver's finger sliding on the touch pad 12, the cursors movement display is performed.

A controller 11 illustrated in FIG. 1 includes a board mounted with a CPU, a memory, various controllers and the like and is arranged on a far side of an instrument panel. The instrument panel is arranged in front of a driver seat. The touchpad 12 is arranged on a center console next to the driver's seat and detects a coordinate point of a finger on the touchpad 12 and outputs a finger position signal indicating the coordinate point to the controller 11. The display device 13 includes a liquid crystal display arranged on the instrument panel and displays the cursor at a position instructed from the controller 11.

The touchpad 12 used may be a capacitive type, a pressure sensing type, and the like. The display device 13 used may be a head-up display which projects display contents to a front windshield (windshield) and the like.

In the present embodiment, the touch pad 12 is used as an input device for the controller 11. However, this is not limiting. For example, a finger movement in an air (or hand movement) may be detected by analyzing a camera image or the like and the detected movement may be used as an input to the controller 11.

When internally classified into functional blocks having respective functions, the controller 11 includes a movement signal generator 14, a band attenuation filter 15, and a display controller 16. The movement signal generator 14 detects a movement amount of a driver's finger based on a finger position signal from the touch pad 12 and generates a time-series signal of the movement amount (also referred to hereinafter as a movement amount signal). The band attenuation filter 15 attenuates a medium frequency component (a signal component from a predetermined first frequency to a predetermined second frequency) of the movement amount signal generated by the movement signal generator 14. The display controller 16 accepts a driver's input operation based on the movement amount signal having passed through the band attenuation filter 15 and performs display control of the cursor on the display device 13.

The movement signal generator 14 corresponds to a time-series signal generator and a time-series signal generation means. The band attenuation filter 15 corresponds to a band attenuation filter. The display controller 16 corresponds to an input operation accepter and an input operation acceptance means.

A cursor display process executed by the operation input device 10 will be described below. This cursor display processing performs a process for displaying a cursor on the display device 13 based on a movement amount of a driver's finger sliding on the touch pad 12 (moving on the touch pad 12).

Figure 3:
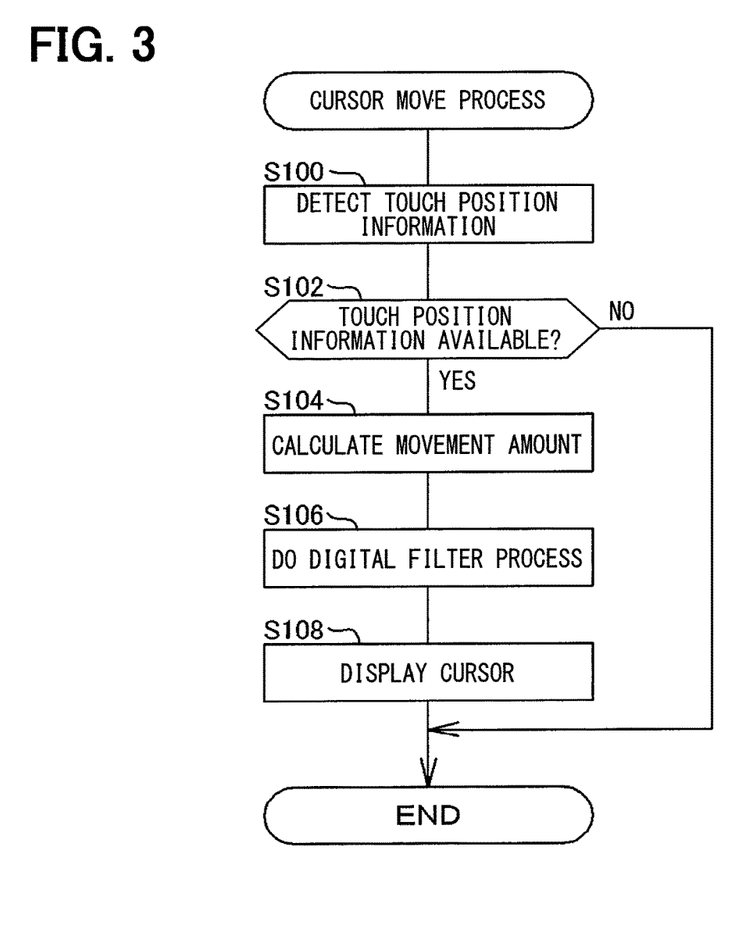
FIG. 3 is a flowchart illustrating a cursor display process executed by a controller.

B. Cursor Display Process:

FIG. 3 illustrates a flowchart of the cursor display process executed by the operation input device 10 of the present embodiment. Although the CPU inside the controller 11 actually executes this cursor display process by executing a program stored in the ROM, the controller 11 or the above-described functional blocks 14 to 16 are illustrated as subjects of action in the below description. At fixed time intervals (e.g., every 4 milliseconds), the cursor display process is executed as a timer interrupt process.

As show in FIG. 3, upon start of the cursor display process, the movement amount signal generator 14 of the controller 11 performs detecting a touch position information of the touch pad 12 (S100). The touch position information is information indicating coordinates (X coordinate, Y coordinate, Z coordinate) of a finger on the touch pad 12.

As a result of S100, when the touch position information is not detected (S102: no), the cursor display process shown in FIG. 2 is ended. Specifically, because non-detection of the touch position information corresponds to absence of the finger on the touch pad 12 (finger non-placement), the cursor display process is ended without moving the cursor (the cursor is stayed at the previous display position).

When the touch position information is detected, that is, when the finger is present (placed) on the touch pad 12 (S102: yes), the movement amount of the finger from the previous execution of the cursor display process in FIG. 2 (e.g., from the 4 milliseconds before) is calculated (S104). This calculation calculates a difference (differences in the X direction and the Y direction) between the coordinate point indicated by the touch position information detected at S100 in this process and the coordinate point indicated by the touch position information detected at S100 in the previous process. For example, when the touch position information detected at S100 in the previous process indicates that the X coordinate is 100 and the Y coordinate is 200 and the touch position information detected at S100 in the previous process indicates that the X coordinate is 110 and the Y coordinate is 215, the difference in the X coordinate 110−100=10 is calculated to be the movement amount in the X direction and the difference in the Y coordinate 215−200=15 is calculated to be the movement amount in the Y direction. Each time when the cursor display process shown in FIG. 3 is executed as the timer interrupt process, the movement amount is calculated at S104 and outputted to the band attenuation filter 15, and accordingly, the time-series signal (movement amount signal) of the movement amount is generated.

If the touch position information is not detected at S100 in the previous cursor display process, the movement amount is 0 at S104 (the movement amount in the X direction is 0 and the movement amount in the Y direction is 0). Specifically, in the operation input device 10 of the present embodiment, because the cursor on the display device 13 is moved based on the movement amount calculated at S104, if the touch position information is not detected at S100 in the previous process, the movement amount is 0 (at a moment of placing the finger on the touch pad 12) in order to prevent the cursor movement at a moment of placing the finger on the touch pad 12.

Figure 4:
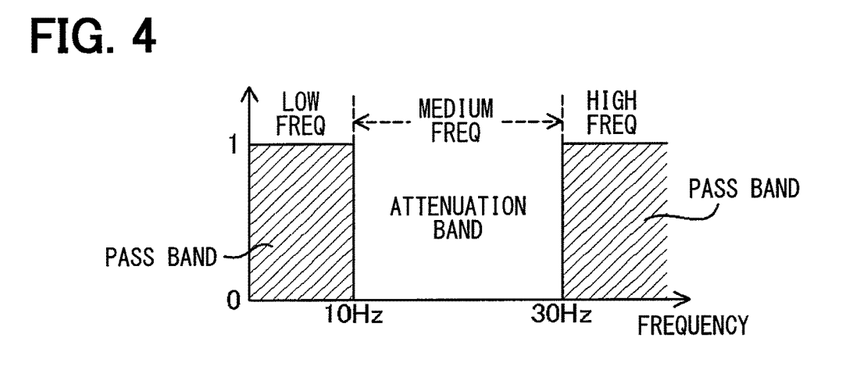
FIG. 4 is a diagram illustrating a frequency band attenuated by a digital filter process of a band attenuation filter.

When the movement amount of the finger on the touch pad 12 is calculated (S104), the movement amount signal generator 14 generate the movement amount signal to output the movement amount to the band attenuation filter 15. The band attenuation filter 15 applies a digital filter process to the movement amount signal (S106). FIG. 4 shows an example of a frequency band attenuated by the digital filter process of the band attenuation filter 15. As shown in FIG. 4, the band attenuation filter 15 applies the digital filter processing to the movement amount signal, thereby attenuating, of the movement amount signal, a signal component from 10 Hz (first frequency) to 30 Hz (second frequency). Specifically, the band attenuation filter 15 passes, of the movement amount signal, a signal component lower than 10 Hz and a signal component higher than 30 Hz, without attenuating, and attenuates the signal component (medium frequency component) from 10 Hz to 30 Hz. A reason for applying the digital filter process to the movement amount signal will be described later.

When the digital filter process is applied to the movement amount signal (S106), the display controller 16 of the controller 11 moves the display of the cursor (movement display) on the display device 13 based on the movement amount signal (mainly the low frequency component and the high frequency component of the movement amount signal) to which the digital filter process has been applied, specifically, the movement amount signal whose medium frequency component has been attenuated. Because the movement amount signal is a signal corresponding to the movement amount of the driver's finger on the touch pad 12, the cursor is displayed at the position by being moved in accordance with pixels corresponding to the movement amount (S108). After the cursor is displayed in this way, the cursor display process in FIG. 3 is ended. The cursor display processing is started up in the timing of the next timer interrupt, of course.

Figure 5A:
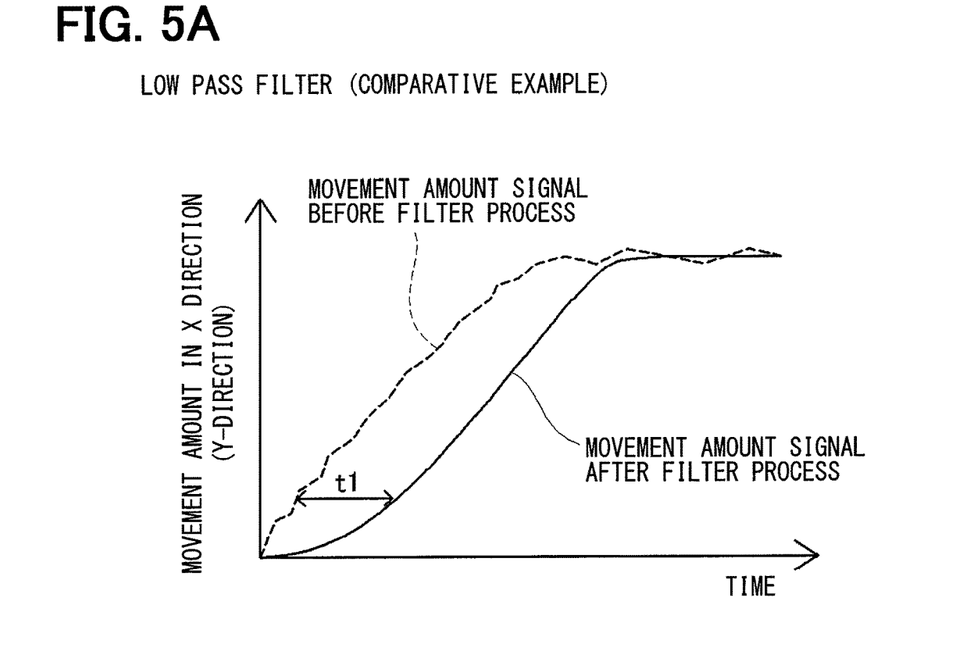
FIG. 5A is a diagram illustrating movement amount signals before and after application of a digital filter process according to a comparative example.

Now, a reason for applying the digital filter process to the movement amount signal at S106 will be described. In FIG. 5A, the dashed line shows a movement amount signal before application of a digital filter process (the movement amount signal before the digital filter process), and the solid line shows a movement amount signal after application of a conventional digital filter process, that is, a movement amount signal (a low frequency component of the movement amount signal) whose medium frequency component and high frequency component have been attenuated by a low pass filter. As shown in FIG. 5A, in the case of the application of the conventional digital filter process, a shaky motion (medium frequency component corresponding to an external factor) resulting from an external factor such as a vehicle body vibration is attenuated and removed from the movement amount signal before the digital filter process and the movement amount signal becomes smooth. Accordingly, when the cursor is displayed based on this movement amount signal, the cursor is smoothly displayed and moved without being influenced by the external factor (without unstable movement).

Figure 5B:
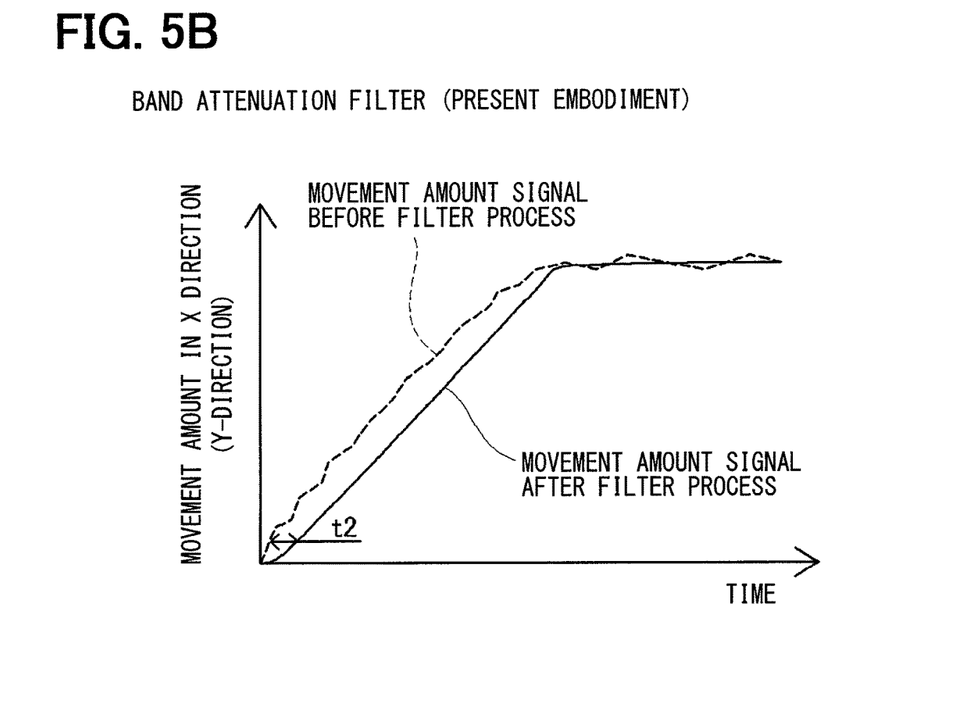
FIG. 5B is a diagram illustrating movement amount signals before and after application of a digital filter process according to an embodiment.

In FIG. 5B, the dashed line shows the movement amount signal before the application of the digital filter process, and the solid line shows the movement amount signal after the application of the digital filter process, i.e., the movement amount signal (the low frequency component and the high frequency component of the movement amount signal) whose medium frequency component has been attenuated by the band attenuation filter 15. As shown in FIG. 5B, in the case of the application of the digital filter process of the present embodiment, a shaky motion (medium frequency component corresponding to an external factor) resulting from an external factor such as a vehicle body vibration is attenuated and removed from the movement amount signal before the digital filter process and the movement amount signal becomes smooth. Accordingly, when the cursor is displayed based on this movement amount signal, the cursor is smoothly displayed and moved without being influenced by the external factor (without unstable movement).

As is clear from the comparison between FIG. 5A and FIG. 5B, when the digital filter process is applied using the band attenuation filter 15, the movement amount signal after the digital filter process rises up earlier than when the digital filter process is applied using the low pass filter. Specifically, as shown in FIG. 5A, when the digital filter process is applied using the low pass filter, there is a delay time t1 until the movement amount signal (solid line) after the digital filter process has the same inclination as the movement amount signal (dashed line) before the digital filter process. By contrast, as shown in FIG. 5B, when the digital filter process is applied using the band attenuation filter 15, a delay time t2 until the movement amount signal (solid line) after the digital filter process has the same inclination as the movement amount signal (dashed line) before the digital filter process is smaller than t1. This is because the band attenuation filter 15 does not attenuate the high frequency component of the movement amount signal, and the high frequency component is left after the digital filter process without being attenuated. Therefore, as compared with the digital filter process using the low pass filter, the digital filter process using the band attenuation filter 15 can shorten a time taken from when the driver moves the finger on the touch pad 12 to when the cursor moves following it. Therefore, a driver's feeling of incompatibility can be suppressed.

Figure 6:
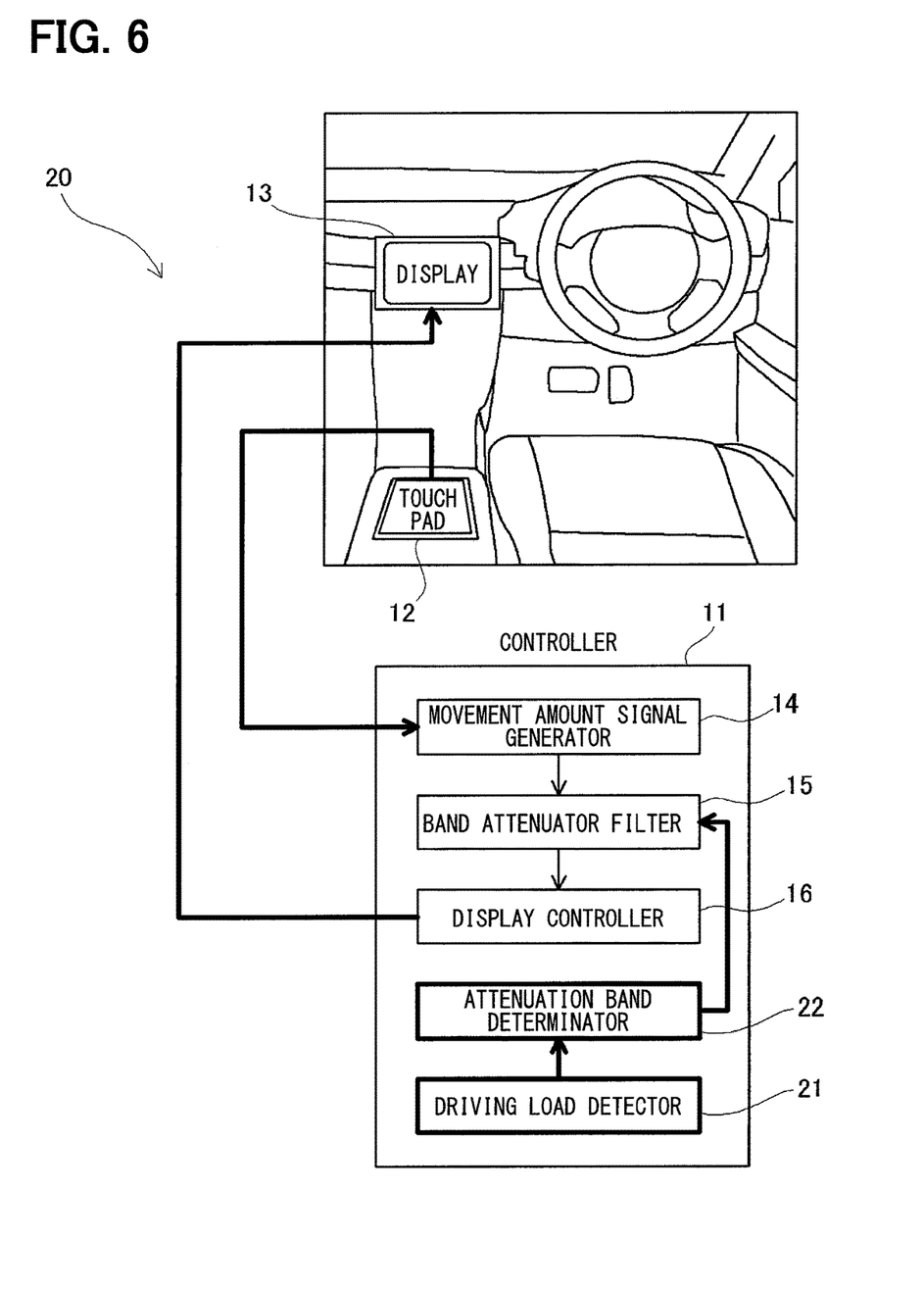
FIG. 6 is a diagram illustrating a configuration of an operation input device according to a first modification.

In the operation input device 10 of the present embodiment, the band attenuation filter 15 attenuates the medium frequency component of the movement signal without attenuating the high frequency component. Therefore, it becomes possible to perform smooth movement display of the cursor while suppressing the influence of the external factor and it becomes possible to shorten the time taken for the movement of the cursor to follow the driver's finger movement. Accordingly, it becomes possible to suppress a driver's feeling of incompatibility C. Modifications:

C-1. First Modification:

A first modification of the above embodiment will be described. As shown by the solid frame in FIG. 6, an operation input device 20 of the first modification includes a driving load detector 21 for detecting a driving load and a attenuation band determiner 22 for determining an attenuation band (at least one of a first frequency or a second frequency) of the band attenuation filter 15. The driving load of the first modification is a load during the driving that influences the movement of the driver's finger on the touch pad 12 (makes the finger shaky). The driving load includes, for example, vehicle sped, acceleration, steering angle, acceleration pedal operation amount, brake pedal operation amount, and vehicle surrounding situation (vehicle-to-vehicle distance, traffic concentration situation, and the like). The driving load detector 21 of the first modification detects at least one of them as the driving load. It is needless to say that various driving loads are detected based on detection values of corresponding sensors. For example, the acceleration is detected based on a detection value of an acceleration sensor. The driving load detector 21 corresponds to a driving load detection means. The band attenuation determiner 22 corresponds to a first determiner and a first determination means.

Figure 7:
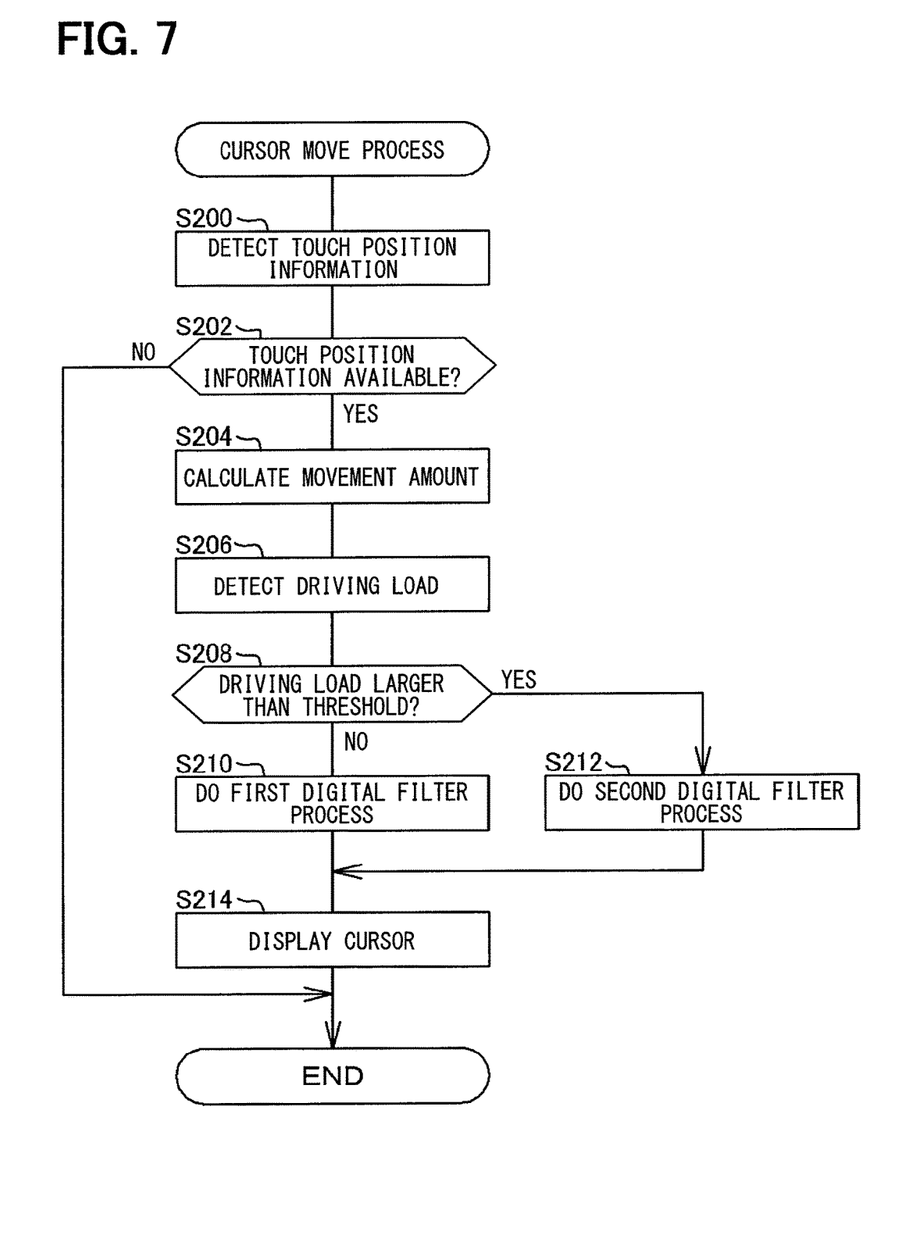
FIG. 7 is a flowchart illustrating a cursor display process according to the first modification.

FIG. 7 illustrates a flowchart of a cursor display processing executed by the controller 11 of the first modification. Upon start of the cursor display process, the controller 11 of the first modification first performs the same steps as S100 to S104 in the embodiment (FIG. 3). Specifically, the movement amount signal generator 14 of the controller 11 detects the touch position information of the touch pad 12 (S200), and calculates the movement amount of the driver's finger on the touch pad 12 based on the touch position information and generates the movement amount signal (S204) when the touch position information is detected (S202: yes).

Subsequently, the driving load detector 21 of the controller 11 detects the above described driving load (S206). The attenuation band determiner 22 of the controller 11 determines whether or not the detected driving load is larger than a predetermined value (S208). For example, in cases where the speed is detected as the driving load, it is detected whether or not the speed is greater than or equal to 75 km/h (in so-called high speed driving). It may be detected whether or not the speed is larger than 0 km/h (traveling state or stop state).

When the result of the determination at S208 is that the driving load is less than or equal to the predetermined value (S208: no), the attenuation band determiner 22 determines the attenuation band of the band attenuation filter 15 to be the same band (from 10 Hz to 30 Hz) as in the embodiment. The digital filter process (also called hereinafter a first digital filter process) using the determined attenuation band (from 10 Hz to 30 Hz) is applied to the movement amount signal by the band attenuation filter 15 (S210). When the driving load is larger than the predetermined value (S208: yes), the attenuation band determiner 22 determines the attenuation band of the band attenuation filter 15 to be a band (from 5 Hz to 30 Hz). The digital filter process (also called hereinafter a second digital filter process) using the determined attenuation band (from 5 Hz to 30 Hz) is applied to the movement amount signal by the band attenuation filter 15 (S212). Then the display controller 16 of the controller 11 moves the display of the cursor on the display device 13 (S214) based on the movement amount signal to which the first digital filter process or the second digital filter process has been applied.

Figure 8A:
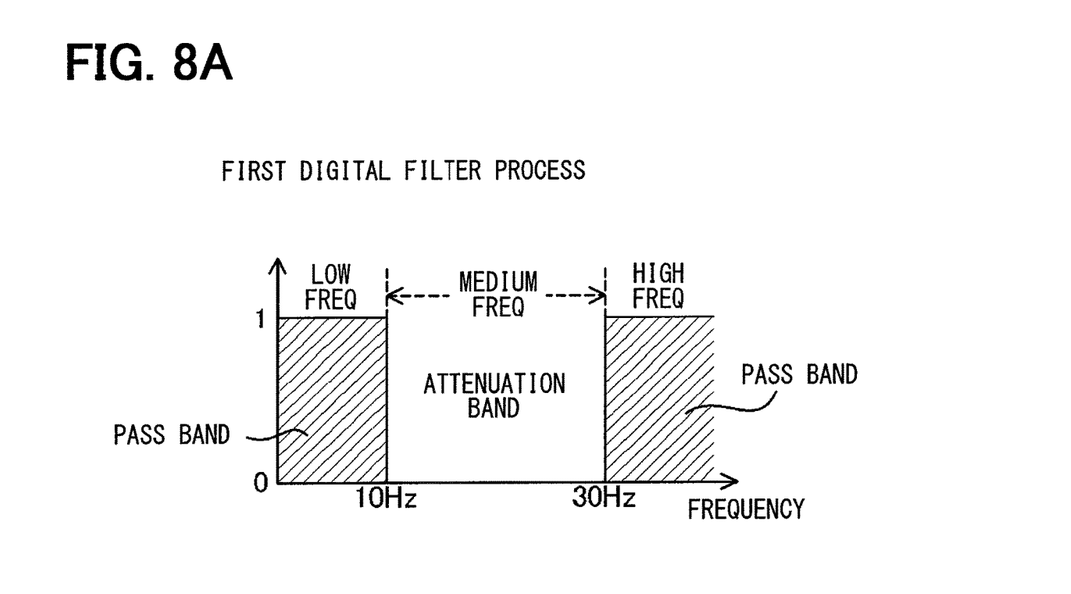
FIG. 8A is a diagram a frequency band attenuated by a first digital filter process of an band attenuation filter according to the first modification.
Figure 8B:
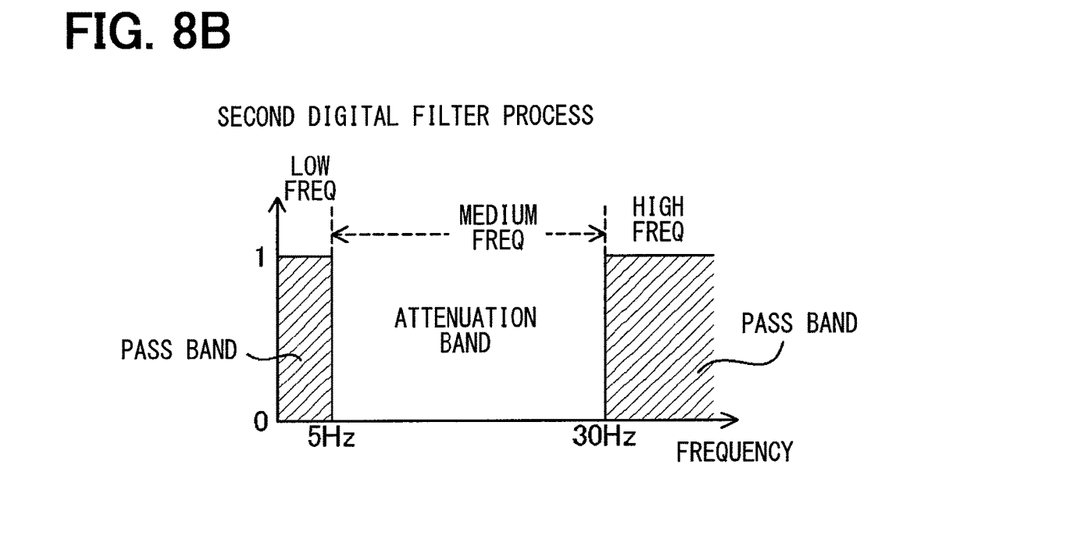
FIG. 8B is a diagram a frequency band attenuated by a second digital filter process of an band attenuation filter according to the first modification.

Now, explanation will be given on the second digital filter process (S212) which is applied to the movement amount signal when the driving load is larger than the predetermined value (S208: yes). FIG. 8A (corresponding to FIG. 4) shows an example of a frequency band attenuated by the first digital filter process of the band attenuation filter 15. FIG. 8B shows an example of a frequency band attenuated by the second digital filter process of the band attenuation filter 15. As clearly shown by comparison between FIG. 8A and FIG. 8B, the second digital filter process attenuates a lower band frequency component than the first digital filter process. A reason for this is as follows. When the driving load is large, the driver cannot concentrate on the cursor movement (the input operation), and thus, the finger movement on the touch pad 12 becomes more easily shaky table than when the driving load is small. In consideration of this, when the driving load is large and the finger movement becomes easily shaky, the frequency component of the movement amount signal in a wide low frequency band of the movement amount signal is attenuated in order to further attenuate the component corresponding to this shaky movement. Accordingly, even when the driving load is large, the shaky movement of the cursor can be suppressed (according to the driving load) and the display of the cursor can be moved smoothly.

In the above-mentioned first modification, the first digital filter process is applied to the movement amount signal when the driving load is small and the second digital filter process is applied to the movement amount signal when the driving load is large. This is however not limiting and may be modified in the following way. For example, the driving load may be divided into three or more grades and a digital filter process corresponding to each grade (digital filter process of attenuating a wider frequency band as the driving load is in a larger grade) may be applied to the movement amount signal. Alternatively, each time the driving load is detected, an attenuation band (frequency component to be attenuated) corresponding to the driving load may be calculated C-2. Second Modification:

A second modification of the above-described embodiment will be described. As shown by the solid frame in FIG. 9, an operation input device 30 of the second modification includes a vibration frequency detector 31 for detecting a frequency of the vehicle and an attenuation band determiner 32 for determining an attenuation frequency band (at least one of a first frequency or a second frequency) of the band attenuation filter 15. The vibration frequency detector 31 detects the vibration frequency of the vehicle using a frequency detection sensor arranged around the touch pad 12 (center console, a driver seat etc.). Specifically, of the vibration of the vehicle, a frequency of a vibration estimated to propagate to the driver's finger is detected. The vibration frequency detector 31 corresponds to a vibration frequency detection means. The attenuation band determiner 32 corresponds to a second determiner and a second determination means.

Figure 10:
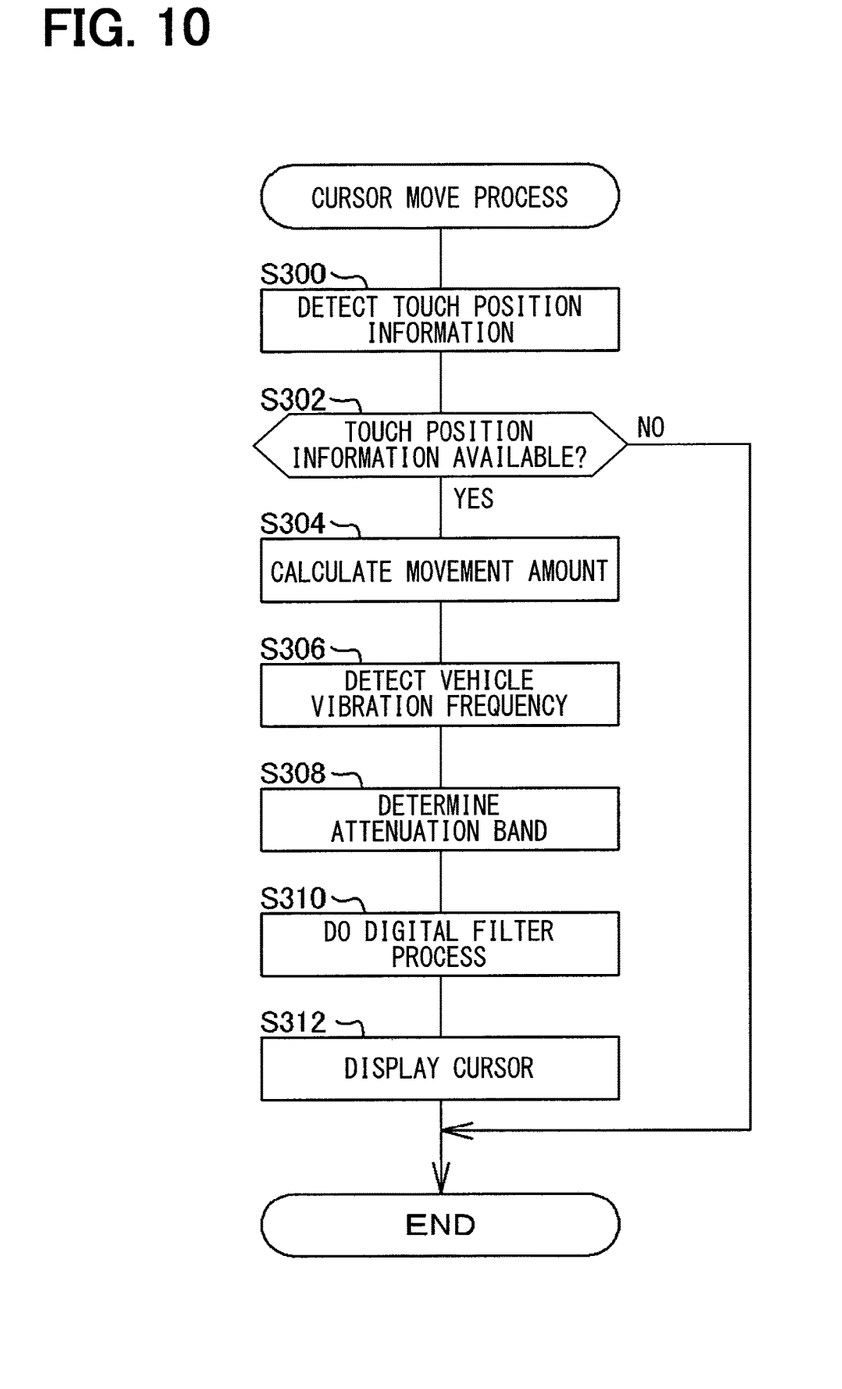
FIG. 10 is a diagram illustrating a cursor display process according to the second modification.

FIG. 10 illustrates a flowchart of a cursor display process executed by the controller 11 of the second modification. Upon start of the cursor display process, the controller 11 of the second modification performs the same steps as S100 to S104 in the embodiment (FIG. 3). Specifically, the movement amount signal generator 14 of the controller 11 detects the touch position information of the touch pad 12 (S300), and calculates the movement amount of the driver's finger on the touch pad 12 based on the touch position information and generates the movement amount signal (S304) when the touch position information is detected (S302: yes).

Subsequently, the vibration frequency detector 31 of the controller 11 detects the frequency of the vehicle, specifically, the frequency of the vibration estimated to propagate to the driver's finger (S306). When the frequency of the vehicle is detected (S306), the attenuation band determiner 32 of the controller 11 determines, based on the frequency of the vehicle, the frequency band to be attenuated. For example, when the detected frequency of the vehicle is in a range from 15 Hz to 20 Hz, the frequency band to be attenuated is determined to be this band from 15 Hz to 20 Hz, or alternatively, a slightly wider band (e.g., from 13 Hz to 22 Hz) (S308).

When the frequency band to be attenuated is determined (S308), the band attenuation filter 15 applies the digital filter process to the movement amount signal to attenuate the determined band (S310). Then the display controller 16 of the controller 11 moves the display of the cursor on the display device 13 (S312) based on the movement amount signal to which the digital filter process has been applied.

Figure 9:
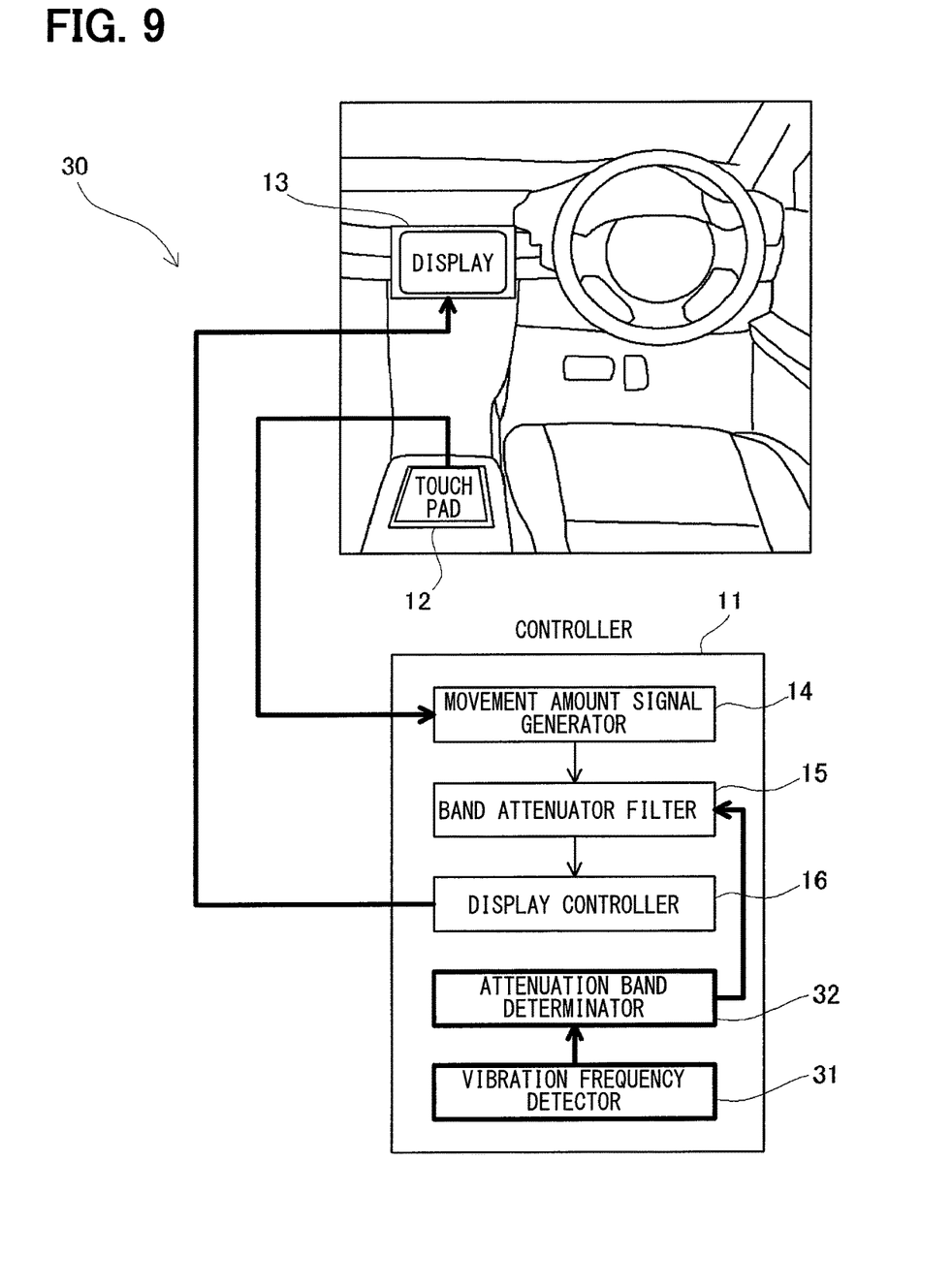
FIG. 9 is a diagram illustrating a configuration of an operation input device 30 according to a second modification.

As described above, the operation input device 30 of the third modification detects the frequency of the vehicle, specifically, the frequency of the vibration estimated to propagate to the driver's finger, and determines, based on the determined frequency, the frequency band covering the determined band (the frequency band to be attenuated). Then, the digital filter process to attenuate the determined frequency band is applied to the movement amount signal. Therefore, of the movement amount signal, a frequency component originating from an external factor (the frequency of the vehicle in this example) can be efficiently attenuated and other frequency components of the movement amount signal can be utilized (left). As a result, the influence of the external factor can be suppressed and the display of the cursor can be more smoothly moved, and the time taken for the cursor movement to follow the driver's finger movement can be more shortened and the driver's feeling of incompatibility can be suppressed.

Although the operation input device of the embodiment and modifications of the present disclosure has been illustrated, embodiments and modifications of the present disclosure are not limited to those illustrated above. Within the spirit and scope of technical ideas of the present disclosure, various embodiments and modifications can be provided.

For example, in the above-illustrated embodiment and modifications, the digital filter process is applied to the movement amount signal corresponding to the finger movement on the touch pad 12. Alternatively, the filter process may be applied to a movement amount signal corresponding to an amount of rotation operation of a dial-type input device. The filter process may be applied to a movement amount signal corresponding to an amount of movement of a driver's hand or a driver's finger in an air. The filter process may be applied to a movement amount signal corresponding to an amount of movement of driver's visual line position.

In the above-illustrated embodiment and modifications, the display of the cursor is moved based on the movement amount signal. Alternatively, a sound volume may be adjusted based on the movement amount signal. A trajectory of the hand or finger movement may be displayed based on the movement amount signal.

In the above-described embodiment and modifications, the digital filter process is applied to the movement amount signal. Alternatively, when the movement amount signal is an analog signal, an analog filter process may be applied to the movement amount signal.

What is claimed is:

1. An operation input device provided in a vehicle and operated by a hand or a finger of a driver to carry out an input according to a movement amount of the hand or the finger of the driver,
   the operation input device comprising a controller configured to:
   detect the movement amount and generate a time series signal of the movement amount;
   accept an input operation of the driver based on the time series signal;
   attenuate, of signal components of the time series signal, a first signal component that is within a first attenuation band from a predetermined first frequency to a predetermined second frequency larger than the first predetermined frequency;
   detect a surrounding situation of the vehicle as a driving load on the driver, the driving load influencing a movement of the hand or the finger of the driver on the operation input device;
   compare the driving load with a predetermined value;
   widen the first attenuation band to a second attenuation band by at least one of decreasing the predetermined first frequency and increasing the predetermined second frequency based on the surrounding situation of the vehicle and in response to the driving load being greater than the predetermined value;
   attenuate, of the signal components of the time series signal, a second signal component that is within the second attenuation band.

2. The operation input device according to claim 1, wherein:
   the controller is configured to use a first digital filter process using the first attenuation band when the driving load is less than the predetermined value and configured to use a second digital filter process when the driving load is greater than the predetermined value, and to widen the first attenuation band to the second attenuation band by decreasing the predetermined first frequency.

3. The operation input device according to claim 1, wherein the controller is configured to detect the driving load on the driver based on at least one of a speed of the vehicle, an acceleration of the vehicle, a steering angle of the vehicle, an acceleration pedal operation amount of the vehicle, a brake pedal operation amount of the vehicle, and a surrounding situation of the vehicle.

4. The operation input device according to claim 1, wherein the first attenuation band is from 10 Hz to 30 Hz and the second attenuation band is from 5 Hz to 30 Hz.

5. The operation input device recited by claim 1 wherein the detected surrounding situation includes at least one of a vehicle-to-vehicle distance and a traffic concentration situation.

6. An operation input device provided in a vehicle and operated by a hand or a finger of a driver to carry out an input according to a movement amount of the hand or the finger of the driver,
   the operation input device comprising a controller configured to:
   detect the movement amount and generate a time series signal of the movement amount;
   accept an input operation of the driver based on the time series signal;
   attenuate, of signal components of the time series signal, a signal component that is within an attenuation band from a predetermined first frequency to a predetermined second frequency larger than the first predetermined frequency;
   detect a vibration frequency of the vehicle;
   detect an operation amount of a driving operation of the vehicle as a driving load on the driver;
   modify at least one of the predetermined first frequency and the predetermined second frequency based on the operation amount of the driving operation of the vehicle and based on the vibration frequency of the vehicle such that the vibration frequency of the vehicle is within the attenuation band.

7. The operation input device recited by claim 6, wherein the detected operation amount includes at least one of a steering angle operation amount, an acceleration pedal operation amount, and a brake pedal operation amount.

8. An operation input method for use in a vehicle and for inputting according to a movement amount of a hand or a finger of a driver when the driver carries out an operation on an operation device with the hand or the finger,
   the operation input method comprising:

detecting the movement amount and generating a time series signal of the movement amount;

attenuating, of signal components of the time series signal, a first signal component that is within a first attenuation band from a predetermined first frequency to a predetermined second frequency larger than the first predetermined frequency; and accepting an input operation of the driver based on the time series signal whose signal component within the first attenuation band from the predetermined first frequency to the predetermined second frequency has been attenuated;

detecting a surrounding situation of the vehicle as a driving load on the driver, the driving load influencing a movement of the hand or the finger of the driver on the operation device;

comparing the driving load with a predetermined value;

widening the first attenuation band to a second attenuation band by at least one of decreasing the predetermined first frequency and increasing the predetermined second frequency based on the surrounding situation and in response to the driving load being greater than the predetermined value;

attenuating, of signal components of the time series signal, a second signal component that is within the second attenuation band.

9. The operation input method according to claim 8, further comprising:

attenuating the first signal component using a first digital filter process using the first attenuation band when the driving load is less than the predetermined value; and attenuating the second signal component using a second digital filter process using the second attenuation band when the driving load is greater than the predetermined value;

wherein widening the first attenuation band to the second attenuation band includes decreasing the predetermined first frequency.

10. The operation input method recited by claim 8, wherein detecting the driving load on the driver is based on at least one of a speed of the vehicle, an acceleration of the vehicle, a steering angle of the vehicle, an acceleration pedal operation amount of the vehicle, a brake pedal operation amount of the vehicle, and a surrounding situation of the vehicle.

11. The operation input method recited by claim 8, wherein the first attenuation band is from 10 Hz to 30 Hz and the second attenuation band is from 5 Hz to 30 Hz.

12. An operation input method for use in a vehicle and for inputting according to a movement amount of a hand or a finger of a driver when the driver carries out an operation with the hand or the finger, the operation input method comprising:

detecting the movement amount and generating a time series signal of the movement amount;

attenuating, of signal components of the time series signal, a signal component that is within an attenuation band from a predetermined first frequency to a predetermined second frequency larger than the predetermined first frequency; and accepting an input operation of the driver based on the time series signal whose signal component within the attenuation band from the predetermined first frequency to the predetermined second frequency has been attenuated;

detecting a vibration frequency of the vehicle;

detecting an operation amount of a driving operation of the vehicle as a driving load on the driver;

modifying at least one of the predetermined first frequency and the predetermined second frequency based on the operation amount of the driving operation of the vehicle and based on the vibration frequency of the vehicle such that the vibration frequency of the vehicle is within the attenuation band.

\* \* \* \* \*